Dec. 30, 1947.  H. KLEMPERER  2,433,371
INDICATING SYSTEM FOR WELDING APPARATUS
Filed July 3, 1943
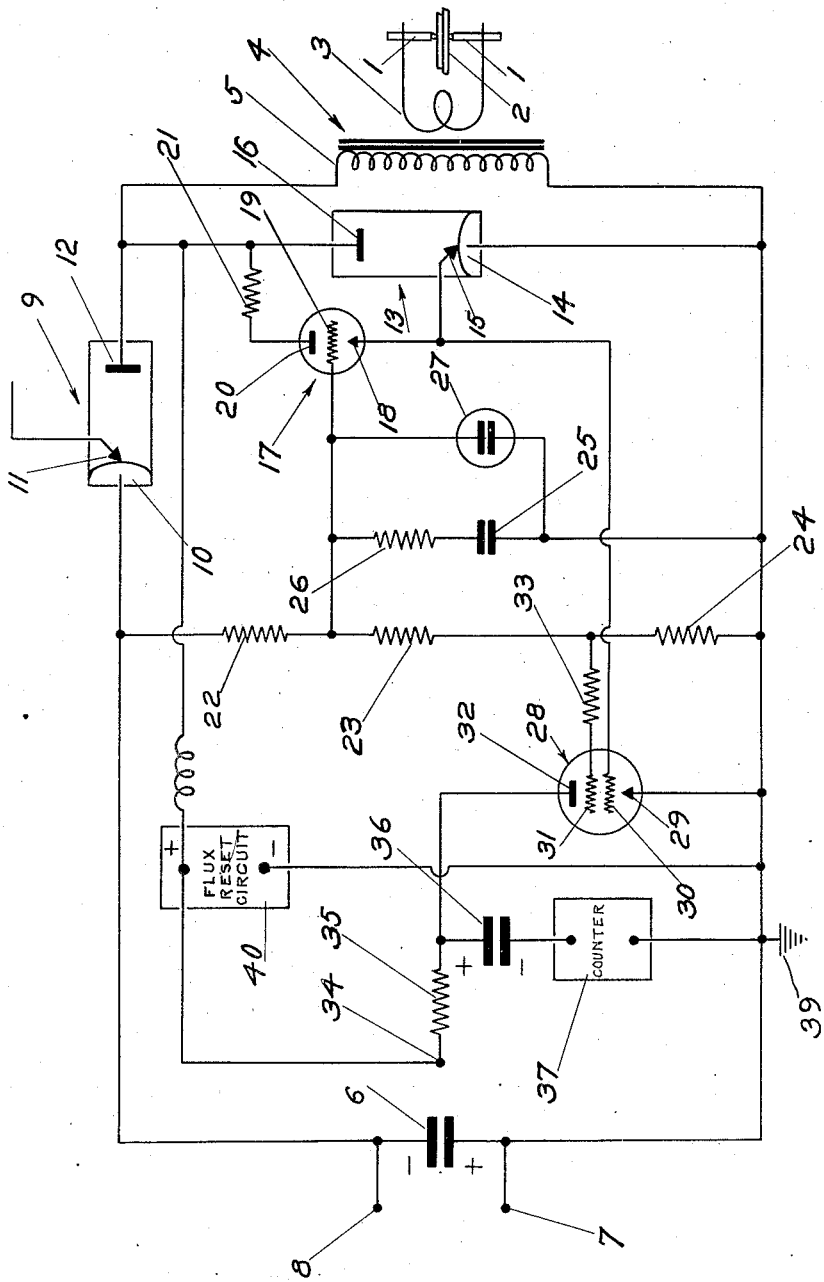
INVENTOR.
HANS KLEMPERER,
BY Elmer J. Gorn
ATTY.

Patented Dec. 30, 1947

2,433,371

UNITED STATES PATENT OFFICE 2,433,371

INDICATING SYSTEM FOR WELDING APPARATUS

Hans Klemperer, Belmont, Mass., assignor to Raytheon Manufacturing Company, Newton, Mass., a corporation of Delaware Application July 3, 1943, Serial No. 493,483

14 Claims. (Cl. 177—311)

1

This invention relates to an apparatus for indicating operating conditions in a welding system.

In spot welding systems of the resistance type it is desirable to count, record or otherwise indicate the successive welds.

It is a primary object of the present invention to provide a means for indicating or counting such successive welds in a welding system of the resistance type.

It is a further object of the invention to provide an indicating system or a weld counter which will distinguish between successful welds and welds which are failures due to some failure of the operating circuit. Accordingly, the invention contemplates a system for energizing a counting device or other indicating means whenever a successful weld has been completed and which will fail to give an indication or register a count when the weld is a failure due to some failure in the welding circuit.

The above and other objects and features of the invention will be made fully apparent to those skilled in the art from a consideration of the following detailed description taken in conjunction with the drawing forming the part hereof, and in which the single figure represents a diagram of a resistance welding system embodying my invention.

Referring to the drawing, reference numeral 1 indicates a pair of welding electrodes, one or both of which may be movable to engage the work 2. Welding impulses are supplied to the work 2 from the secondary winding 3 of a transformer 4 having a primary winding 5. The primary winding 5 of the transformer 4 is adapted to be supplied with energy impulses from a condenser 6 which may be a bank of electrolytic condensers and which is adapted to be charged from any suitable source of direct current, such as a rectifier, battery, or a direct current generator by way of the terminals 7 and 8 which are connected to the positive and negative terminals, respectively, of such source.

The discharge of the condenser 6 through the primary winding 5 of the transformer 4 is adapted to be controlled by a gaseous discharge tube 9, which gaseous discharge tube is preferably of the type having a pool type cathode 10, an igniter 11, and an anode 12. The pool type cathode 10 is connected directly to the negative side of the condenser 6, and the anode 12 is connected through the primary winding 5 of the transformer 4 to the positive side of the condenser. The igniter 11 is adapted to be supplied with igniting impulses from

2 any suitable source, which source it will be understood is controlled to cause the discharge of the tube 9 in the proper timing to effect successive spot welds in the work 2 upon successive engagements of the electrodes 1 with the work. In circuits of this type it will be understood that the condenser 6 is charged for each successive weld and discharged in one direction through the primary winding 5. After the discharge of the condenser there remains in the welding circuit, including the transformer 4, a considerable amount of energy which tends to maintain a current through the system in the same direction as the original direct current impulse from the condenser 6 therethrough and thus tends to reverse the potential across said condenser. In order to permit this energy to decay through the load 2, it is desirable to provide a shunt circuit across the primary winding 5, which shunt circuit becomes effective upon the reversal of the potential in the condenser 6. To this end a shunt circuit is provided across the terminals of the primary winding 5 of the transformer 4, which shunt circuit includes a shunt tube 13. The shunt tube 13 is preferably of the same type as the series tube 9 having a pool type cathode 14 connected to the winding 5 at a point between the positive plate of the condenser 6 and said winding. The tube 13 is also provided with an igniter 15 and an anode 16. The anode 16 is connected to the primary winding 5 at a point between said winding and the anode 12 of the series tube 9. Igniting impulses are adapted to be supplied to the igniter 15 by way of a controlled discharge tube 17 having a cathode 18, a control grid 19, and an anode 20. The cathode 18 is preferably of the permanently energized type and the anode 20 is connected by way of a resistance 21 to the anode 16 of the tube 13.

A series of resistances 22, 23, and 24 are connected across the condenser 6, the resistance 22 being connected at a point between the negative side of the condenser 6 and the cathode 10 of the tube 9, and resistance 24 is connected to the positive side of said condenser at a point between the same and the primary winding 5. The control grid 19 of the tube 17 is connected to the resistance 22 at a point between this resistance and resistance 23.

A condenser 25 is provided with one pole connected by way of a resistance 26 to the line between resistance 22 and grid 19, and its opposite pole connected to the line between condenser 6 and the primary winding 5 of transformer 4. A shunt circuit containing a cathode glow tube 27 is provided across the condenser 25 and resistance 26.

A gaseous discharge tube 28 is provided with a cathode 29, a pair of control electrodes or grids 30 and 31, and an anode 32. The cathode 29, which is preferably of the permanently energized type, is connected to the line between the positive plate of the condenser 6 and the primary winding 5 of the transformer 4. The grid 30 is connected to the line between the cathode 18 of the discharge tube 17 and the igniter 15 of the pool type tube 13. The grid 31 is connected by way of a resistance 33 to the connection between the resistance 23 and resistance 24. The anode 32 of the tube 28 is connected by way of a resistance 35 to the positive terminal 34 of a source of potential of about 300 volts. A condenser 36 is provided with a positive pole connected to the terminal 34 at a point between the resistance 35 and the anode 32 of the tube 28, and a negative pole connected by way of an indicating device or counter 37 to the line between the positive side of the condenser 6 and the primary winding 5 of the transformer 4. The indicating device 37 may be any device capable of giving a visual or other indication when an electrical impulse of sufficient energy passes therethrough. Preferably the device is of the recording type capable of registering the number of such energy impulses therethrough so that a count of the number of successful welds will be readily obtainable. The counter 37 may also be grounded as indicated at 39.

In operation it will be understood that the main welding circuit including the condenser 6, the transformer 4, and the series tube 9 together with the shunt circuit, including the shunt tube 13, are already well known in the art, and since this circuit constitutes but one well known form of a resistance welding system it will be understood that the applicant's invention may be readily applied to other forms of welding systems from a consideration of its application in the form shown.

In welding systems of the type shown, the condenser 6 is charged from a suitable source of direct current supplied thereto by way of the terminals 7 and 8. It will be understood that in systems of the type to which the invention relates the condenser 6 is successively charged and discharged for each application of the electrodes 1 to the work 2 effecting a plurality of successive spot welds as the work 2 is fed to the electrodes. The condenser 6 is discharged through the transformer 4, the timing of such discharge being controlled by the arc discharge tube 9, the igniter 11 of which is supplied with suitably timed impulses to coincide with the proper engagement between electrode 1 and the work 2. As the condenser 6 is discharged through the welding load the potential upon the condenser falls to zero at a time when the current through the load is at a maximum. At this time the voltage of the condenser 6 tends to reverse. After the reverse potential has reached a value, which value is predetermined in a manner which will be hereinafter fully described, the shunt tube 13 is ignited and the energy stored in the welding circuit, including the transformer 4, tends to decay through the tube 13.

Ignition impulses are supplied to the igniter 15 of the tube 13 by way of the gaseous discharge tube 17. In order to insure that the reverse potential upon the condenser 6 has attained a minimum predetermined value, the grid 19 of tube 17 is connected to the negative side of the condenser 6 by way of a resistance 22. A cathode glow tube 27 is connected between the grid and the side of the condenser which is originally positive so that prior to the reversal of the polarity of the condenser 6 the grid 19 will be maintained negative relative to its cathode 18. The condenser 25, which is connected across the tube 27 by way of the resistance 26, is charged at the same time as condenser 6 but due to resistance 26 tends to discharge at a much slower rate so that upon the reversal of the polarity of the condenser 6 the charge on the condenser 25 tends to oppose the positive potential applied on the grid 19 from the originally negative side of condenser 6 by way of the resistance 22 until this reverse polarity has built up to a predetermined value. When the predetermined reverse value of the voltage upon the condenser 6 has been attained the grid 19 of the tube 17 becomes positive relative to the cathode 18 permitting an igniting impulse to be supplied to the igniter 15 of the shunt tube 13. Thereupon the shunt tube picks up, and energy stored in the welding circuit, including the transformer 4, decays substantially exponentially through the tube 13. Upon conduction of the shunt tube 13 the series tube 9 becomes extinguished.

In such systems any failure in the main welding circuit, such as failure of the charging circuit for condenser 6 or a failure of the series tube 9 to discharge, will be reflected in a failure of the potential upon the condenser 6 to tend to reverse in the course of its discharge. Such a failure would result either in missing a weld completely or in a defective weld. Furthermore, if the supply of ignition impulses to the tube of the shunt circuit should fail, the weld would likewise be defective since the energy supplied to the work for welding purposes would not be the same as when the circuit is functioning in its normal manner.

In order to provide a means for readily determining whether or not one of the successive welds is defective by reason of any failure in either the main circuit or some auxiliary circuit, such as the shunt circuit controlled by the tube 13, I provide a means whereby a suitable indicator 37 fails to register upon any failure of the main or auxiliary circuit. In such systems it is desirable to count the number of successive spot welds performed by the system since it is desirable to change electrodes after a predetermined number of welds and for other reasons. Preferably, therefore, the indicator 37 is also a counter which registers for each successive weld but which fails to register upon any failure of the main or auxiliary circuits. To this end the counter 37 is connected in series with condenser 36 to the terminal 34 which is connected to any suitable source of positive potential. The source of flux reset current 40 is a preferred source of current for charging the condenser 36. Any other source of about 300 volts is suitable in circuits where no flux reset current is provided. The operation and function of the flux reset circuit is disclosed in the United States Patent 2,294,388, issued September 1, 1942, to John W. Dawson.

The condenser 36 is charged from said source of potential through the weld counter 37. The flow of current through the weld counter 37 during this charging of the condenser 36 is limited by the resistance 35 so that it is insufficient to actuate the indicating or recording means of the counter 37.

A gaseous discharge tube 28 controls the discharge of the condenser 36 and the conduction of this tube is made dependent upon the reversal of the polarity of the condenser 6 and upon the flow of decay current through the shunt circuit, including the tube 13. To this end the grid 30 is connected to the line between the cathode 18 of the tube 17 and the igniter 15 of the shunt tube 13. The grid 31 is connected by way of a small grid resistance 33 to the line connecting the resistances 23 and 24. By this arrangement the tube 28 does not tend to discharge until the shunt tube 13 has become conductive and the potential upon the condenser 6 has attained a predetermined inverse value for the following reasons. As long as the charge on condenser 6 is in its original polarity the tube 28 does not conduct since the grid 31 is maintained negative relative to cathode 29. The value of the potential drop between cathode 29 and grid 31 is substantially that of the constant potential drop through the cathode glow tube 27 since the resistances 23 and 33 are small and the resistance 24 is large. After the potential on the condenser 6 has fallen to zero and tends to reverse, the grid 31 is still maintained negative relative to the cathode 29 until a predetermined inverse voltage has been built up on condenser 6, since the condenser 25, the action of which with respect to the bias on grid 19 of tube 17 has already been described, acts in the same manner with respect to grid 31 of tube 28. The characteristics of the tube 28 are such that both grids 30 and 31 must be positive relative to the cathode 29 before the tube can be discharged. Thus, the bias on the grid 31 is sufficient to prevent discharge of the tube 28 unless and until a predetermined inverse voltage is built up on the condenser 6, regardless of the bias on grid 30.

The grid 30 is connected to the igniter 15, which igniter constitutes a resistance. As long as there is no flow of current in the tube 17 the grid 30 is maintained at substantially the same potential as the cathode 29. However, when the tube 17 becomes conductive, as hereinbefore described, the grid 30 becomes positive relative to the cathode 29 by reason of the inherent resistance of the igniter 15. Thus the grid 30 does not permit conduction until an ignition impulse has been supplied to the tube 13.

When both of the grids 30 and 31 become positive under the conditions described above, the tube 28 becomes conductive and the condenser 36 is discharged through the counter 37. This discharge of the condenser 36 occurs more quickly than the charging of the condenser and the resulting electrical impulse through the indicator or weld counter 37 is sufficient to actuate the same to register or count an effective weld. It will be seen that upon failure of the charge on the condenser 6 to reverse, or upon failure of the shunt tube 13, the bias upon the grid 30 or the grid 31 will prevent conduction of the tube 28 and accordingly the condenser 36 will not be discharged to register an effective weld in the counter or indicator 37.

When a flux resetting current is to be supplied to the primary winding 5 of the transformer 4 for the purpose of resetting the flux in the transformer, in the manner described in the aforementioned United States patent, 2,294,388, the source of flux reset current is preferably used as the source of current for charging the condenser 36. In this case it will be seen that the weld counter or indicator 37 will also fail to register in the event of a failure of the flux reset circuit, since in this case there will be a failure of the energy supply to the weld counter.

Although there has been herein described but a single embodiment of the invention, other embodiments within the scope of the appended claims will be readily apparent to those skilled in the art from a consideration of the embodiment herein shown. Particularly, it will be understood that the indicating or registering system may be employed with other welding systems than the particular welding system shown. For example, the welding system need not necessarily be of the preferred energy storage type having a condenser 6 as shown, but may be of any other type in which an energy impulse having a large direct current component is supplied to a welding load.

What is claimed is:

1. An apparatus for indicating operating conditions in a welding system having a main welding circuit and a shunt circuit across said main welding circuit, comprising a condenser, an indicating device operable in response to energy impulses from said condenser, circuit means to discharge said condenser through said indicating device, and means in said circuit means controlled by both said main welding circuit and said shunt circuit for controlling the discharge of said condenser.

2. A welding system including a storage condenser, a load circuit, valve means controlling the discharge of said storage condenser through said load circuit, the parameters of said load circuit being such that the polarity of said condenser tends to reverse during the discharge thereof through said load circuit, an indicating device operable in response to impulses therethrough, circuit means for supplying an energy impulse to said indicating device, and means responsive to the reversal of polarity of said storage condenser for controlling said circuit means.

3. A welding system including a storage condenser, a load circuit through which said storage condenser is discharged to produce an energy impulse having rising and decaying components, a shunt circuit across said load circuit for shunting the decay energy of said load circuit, the parameters of said load circuit being such that the polarity of said storage condenser tends to reverse during the discharge thereof through said load circuit, an indicating device operable in response to energy impulses therethrough, circuit means for supplying an energy impulse to said indicating device, and means responsive to the reversal of polarity of said storage condenser and the presence of decay energy in said shunt circuit for controlling said circuit means.

4. A welding system including a storage condenser, a load circuit, valve means controlling the discharge of said storage condenser through said load circuit, the parameters of said load circuit being such that the polarity of said storage condenser tends to reverse during discharge, an indicating device operable in response to impulses therethrough, circuit means for supplying an energy impulse to said indicating device, means normally blocking said circuit means, and means responsive to the reversal of polarity of said storage condenser for rendering said means normally blocking said circuit means ineffective.

5. In a welding system of the type having a load circuit in which energy impulses rise and decay, a shunt circuit across said load circuit for shunting the decay energy of said load circuit, an indicating device operable in response to energy impulses therethrough, circuit means for supplying an energy impulse to said indicating device, means normally blocking said circuit means, and means responsive to the presence of decay energy in said shunt circuit for rendering said means normally blocking said circuit ineffective.

6. A welding system including a storage condenser, a load circuit through which said storage condenser is discharged to produce an energy impulse having rising and decaying components, a shunt circuit across said load circuit for shunting the decay energy of said load circuit, the parameters of said load circuit being such that the polarity of said condenser tends to reverse during the discharge thereof through said load circuit, an indicating device operable in response to energy impulses therethrough, circuit means for supplying an energy impulse to said indicating device, means normally blocking said circuit means, and means responsive to the reversal of polarity of said storage condenser and the presence of decay energy in said shunt circuit for rendering said means normally blocking said circuit means ineffective.

7. A welding system including a storage condenser, a load circuit through which said storage condenser is discharged, the parameters of said load circuit being such that the polarity of said storage condenser tends to reverse during the discharge thereof through said load circuit, a second condenser, an indicating device operable in response to energy impulses from said second condenser, circuit means to discharge said second condenser through said indicating device, and means responsive to the reversal of polarity of said storage condenser for controlling the discharge of said second condenser through said circuit means.

8. A welding system including a storage condenser, a load circuit through which said storage condenser is discharged to produce an energy impulse having rising and decaying components, a shunt circuit across said load circuit for shunting the decay energy of said load circuit, the parameters of said load circuit being such that the polarity of said condenser tends to reverse during the discharge thereof through said load circuit, a second condenser, an indicating device operable in response to energy impulses from said second condenser, circuit means to discharge said second condenser through said indicating device, and means responsive to the reversal of polarity of said storage condenser and the presence of decay energy in said shunt circuit for controlling said circuit means.

9. A welding system including a transformer, means for resetting the flux in said transformer, a condenser, an indicating device operable in response to energy impulses from said condenser, means to charge said condenser from said flux reset circuit, circuit means to discharge said condenser through said indicating device, and means responsive to the passage of an energy impulse through said welding circuit for controlling said circuit means.

10. A welding system including a load circuit in which energy impulses rise and decay, said load circuit including a transformer, a flux reset circuit for resetting the flux in said transformer, a shunt circuit across said load circuit, a condenser, an indicating device operable in response to energy impulses from said condenser, means to charge said condenser from said flux reset circuit, circuit means to discharge said condenser through said indicating device, and means responsive to the presence of decay energy in said shunt circuit for controlling said circuit means.

11. In a welding system, a storage condenser, a load circuit including a transformer through which said storage condenser is discharged, the parameters of said load circuit being such that the polarity of said storage condenser tends to reverse during the discharge thereof through said load circuit, a flux reset circuit for resetting the flux in said transformer, a second condenser, an indicating device operable in response to energy impulses from said second condenser, circuit means to charge said second condenser from said flux reset circuit, means to discharge said second condenser through said indicating device, and means responsive to the reversal of polarity of said storage condenser for controlling the discharge of said second condenser through said circuit means.

12. In a welding system, a storage condenser, a load circuit including a transformer through which said storage condenser is discharged to produce an energy impulse having rising and decaying components, a shunt circuit across said load circuit for shunting the decay energy of said load circuit, the parameters of said load circuit being such that the polarity of said storage condenser tends to reverse during the discharge thereof through said load circuit, a flux reset circuit for resetting the flux in said transformer, a second condenser, means to charge said second condenser from said flux reset circuit, an indicating device operable in response to energy impulses from said second condenser, circuit means to discharge said second condenser through said indicating device, and means responsive to the reversal of polarity of said storage condenser and the presence of decay energy in said shunt circuit for controlling said circuit means.

13. A welding system including a storage condenser, a load circuit through which said storage condenser is discharged to produce an energy impulse having rising and decaying components, a shunt circuit across said load circuit for shunting the decay energy of said load circuit, the parameters of said load circuit being such that the polarity of said condenser tends to reverse during the discharge thereof through said load circuit, a second condenser, an indicating device operable in response to energy impulses from said second condenser, circuit means including a gaseous discharge tube having a plurality of control grids to discharge said second condenser through said indicating device, and means including said grids responsive to the reversal of polarity of said storage condenser and the presence of decay energy in said shunt circuit for controlling said circuit means.

14. A condenser welding system comprising a condenser adapted to be discharged through a welding load circuit having inductance, said discharge tending to be oscillatory and the polarity of the potential across said inductance reversing, a shunt circuit across said load, a controlled ignition discharge tube arranged in said shunt circuit and adapted to be fired when said reversed potential has reached a predetermined value, an indicating device operable in response to energy impulses therethrough, and means controlled by both said welding load circuit and said shunt circuit for energizing said indicating device.

HANS KLEMPERER.

(References on following page)

REFERENCES CITED

The following references are of record in the file of this patent:

UNITED STATES PATENTS

| Number | Name | Date |
|---|---|---|
| 2,278,516 | Gulliksen | Apr. 7, 1942 |
| 1,919,978 | Dempster | July 25, 1933 |
| 1,938,499 | Ragsdale | Dec. 5, 1933 |
| 2,093,982 | Ragsdale | Sept. 21, 1937 |
| 1,762,712 | Charlton | June 10, 1930 |
| 2,088,478 | Kovalsky | July 27, 1937 |
| 2,370,009 | Clark et al. | Feb. 20, 1945 |

FOREIGN PATENTS

| Number | Country | Date |
|---|---|---|
| 468,789 | Great Britain | July 12, 1937 |